UNITED STATES PATENT OFFICE.

JACOB STEPHAN, OF CLEVELAND, OHIO, ASSIGNOR OF ONE-HALF TO GODFREY FUGMAN, OF CLEVELAND, OHIO.

COMPOSITION SUITABLE FOR USE IN MAKING TOY BUILDING-BLOCKS OR THE LIKE.

SPECIFICATION forming part of Letters Patent No. 708,422, dated September 2, 1902.

Application filed January 20, 1902. Serial No. 90,560. (No specimens.)

*To all whom it may concern:*

Be it known that I, JACOB STEPHAN, a citizen of the United States of America, residing at Cleveland, in the county of Cuyahoga and State of Ohio, have invented a certain new and useful Composition Suitable for Use in Making Toy Building-Blocks or the Like; and I hereby declare the following to be a full, clear, and exact description of the invention, such as will enable others skilled in the art to which it pertains to make and use the same.

This invention relates to a composition suitable for use in making toy building-blocks and the like.

The object of this invention is to provide a composition for making articles of the character indicated which are durable and inexpensive.

The method of making my new composition comprises, first, the provision of a dry mixture composed of whiting, plaster-of-paris, and whitish or light-colored or bright sand or pulverized rock material—such, for instance, as pulverized limestone, pulverized marble, or silica. The ingredients of the said mixture are preferably in the proportions, by measure, of one part of plaster-of-paris, one part of whiting, and three parts of sand or pulverized rock material. A somewhat inferior mixture is obtained by omitting the plaster-of-paris and substituting whiting and sand or pulverized rock material. A small quantity of black or dark sand or pulverized rock material is added to and thoroughly mixed with the aforesaid plaster-of-paris, whiting, and whitish or bright sand or pulverized rock material.

Silica sand is preferably used in making the mixture hereinbefore described.

The method already partially disclosed comprises also the preparation of a liquid compound consisting of white lead, zinc-white, vegetable oil, and paint-drier in the proportions of seven per cent. paint-drier, one and one-half per cent. white lead, one and one-half per cent. zinc-white, and ninety per cent. oil. Linseed-oil is preferred. The paint-drier consists, preferably, of litharge, benzene, and magnesia, comprising equal parts of the litharge and magnesia and enough benzene to sufficiently thin the drier. The said liquid compound constitutes a binding liquid suitable for use in binding together or effecting an attachment between the ingredients of the dry mixture hereinbefore described, and the said dry mixture and the binding liquid are stirred and mixed together in any approved manner until a plastic mass is formed, and the preferred proportions of the binding liquid and the dry mixture for the said mass are preferably ten per cent. of the binding liquid, by measure, to ninety per cent. of the dry mixture. The resulting mass is then molded under considerable pressure into toy building-blocks and the like.

I would call especial attention to the importance of including black or dark sand or rock material as an ingredient of the dry mixture, because the said ingredient when thoroughly mixed with the mass, as it is by making it an element of the dry mixture hereinbefore described, makes the resulting composition a fair imitation of granite.

What I claim is—

1. A composition consisting of a dry mixture comprising, as ingredients, whiting and a whitish or light-colored or bright sand or pulverized rock material, approximately in the proportions specified, and a small quantity of dark sand or pulverized rock material, and a binding liquid mixed with the dry mixture in the proportions required to render the resulting mass plastic and bind and hold the ingredients of the dry mixture together.

2. A composition comprising a dry mixture composed of a whitish or light-colored or bright sand or pulverized rock material, plaster-of-paris, whiting and dark sand or pulverized rock material in about the proportions, by measure, of one part of whiting, one part of plaster-of-paris, and three parts of the whitish or bright sand, with the dark sand equal in quantity to about one per cent. of the dry mixture, and a binding liquid mixed with the dry mixture approximately in the proportions specified.

3. A composition consisting of a dry mixture composed of whiting and sand or pulverized rock material, approximately in the proportions specified, and a binding liquid mixed with the dry mixture and comprising, as ingredients, white lead, zinc-white, vegetable oil, and paint-drier.

4. A composition consisting of a dry mixture comprising whiting and sand or pulverized rock material, approximately in the proportions specified, and a binding liquid mixed with the dry mixture and comprising, as ingredients, white lead, zinc-white, linseed-oil, and paint-drier, approximately in the proportions specified.

5. A composition consisting of a dry mixture comprising sand or pulverized rock material and whiting, approximately in the proportions specified, and a binding liquid mixed with the dry mixture in the proportions of about ten per cent. of the liquid and ninety per cent. of the dry mixture, with the liquid comprising, as ingredients, white lead, zinc-white, vegetable oil, and paint-drier.

6. A composition composed of a dry mixture and a binding liquid mixed with the mixture and binding or holding the ingredients of the dry mixture together, with the dry mixture comprising, as ingredients, sand or pulverized rock material, plaster-of-paris and whiting approximately in the proportions specified, and with the binding liquid comprising, as ingredients, white lead zinc-white, vegetable oil and paint-drier approximately in the proportions specified.

7. A composition comprising a dry mixture and a binding liquid mixed with the dry mixture approximately in the proportions specified, with the dry mixture comprising, as ingredients a whitish or light-colored or bright sand or pulverized rock material, plaster-of-paris, whiting, and dark sand or pulverized rock material approximately in the proportions specified, and with a binding liquid comprising, as ingredients, white lead, zinc-white, vegetable oil, and paint-drier in approximately the proportions specified.

In testimony whereof I sign the foregoing specification, in the presence of two witnesses, this 16th day of January, 1902, at Cleveland, Ohio.

JACOB STEPHAN.

Witnesses:
C. H. DORER,
TELSA SCHWARTZ.